(12) United States Patent
Nellen

(10) Patent No.: US 8,136,872 B2
(45) Date of Patent: Mar. 20, 2012

(54) OPEN ROOF CONSTRUCTION FOR A VEHICLE

(75) Inventor: Marcel Johan Christiaan Nellen, Merselo (NL)

(73) Assignee: Inalfa Roof Systems Group B.V., Venray (NL)

(*) Notice: Subject to any disclaimer, the term of this patent is extended or adjusted under 35 U.S.C. 154(b) by 0 days.

(21) Appl. No.: 12/920,415

(22) PCT Filed: Mar. 4, 2008

(86) PCT No.: PCT/EP2008/052602
§ 371 (c)(1),
(2), (4) Date: Oct. 6, 2010

(87) PCT Pub. No.: WO2009/109219
PCT Pub. Date: Sep. 11, 2009

(65) Prior Publication Data
US 2011/0037295 A1    Feb. 17, 2011

(51) Int. Cl.
*B60J 7/05* (2006.01)
(52) U.S. Cl. ........................ 296/221; 296/223
(58) Field of Classification Search ................. 296/221, 296/223
See application file for complete search history.

(56) References Cited

U.S. PATENT DOCUMENTS

| 4,911,497 A | 3/1990 | Schreiter |
| 6,129,413 A | 10/2000 | Klein |
| 6,390,545 B1 * | 5/2002 | Makino et al. ............... 296/223 |
| 6,527,337 B2 * | 3/2003 | Farber ........................... 296/222 |
| 2005/0218704 A1 | 10/2005 | Uehara |

FOREIGN PATENT DOCUMENTS

| DE | 19851366 | 5/1999 |
| EP | 0331910 | 9/1989 |
| EP | 1741588 | 1/2007 |

OTHER PUBLICATIONS

Official Search Report of the European Patent Office in counterpart foreign application No. PCT/EP2008/052602 filed Mar. 4, 2008.
Written Opinion of the European Patent Office in counterpart foreign application No. PCT/EP2008/052602 filed Mar. 4, 2008.

* cited by examiner

*Primary Examiner* — Dennis Pedder
(74) *Attorney, Agent, or Firm* — Steven M. Koehler; Westman, Champlin & Kelly, P.A.

(57) ABSTRACT

Open roof construction for a vehicle comprising a roof opening defined in a stationary roof part and a movable panel. A slide is movable along a stationary slide guide and is provided with panel engagement elements cooperating with slide engagement elements of the movable panel. A movement of the slide is capable of generating a tilting and/or sliding movement of the panel. The panel engagement elements of the slide comprise two curves and the slide engagement elements of the panel comprise two cams, each for cooperation with a respective one of the curves. Moving the slide in a first direction a cooperation between a first curve and corresponding first cam will lead to lowering a first transversal edge of the panel followed by translating the panel along with the slide. Moving the slide in an opposite second direction a cooperation between the second curve and corresponding second cam will lead to lifting said first transversal edge.

21 Claims, 4 Drawing Sheets

OPEN ROOF CONSTRUCTION FOR A VEHICLE

CROSS-REFERENCE TO RELATED APPLICATION

This Application is a Section 371 National Stage Application of International Application No. PCT/EP2008/052602, filed Mar. 4, 2008 and published as WO 2009/109219 A1 on Sep. 11, 2009, in English.

BACKGROUND

The discussion below is merely provided for general background information and is not intended to be used as an aid in determining the scope of the claimed subject matter.

Aspects of invention relate to an open roof construction for a vehicle, comprising a roof opening defined in a stationary roof part and a movable panel for opening and closing said roof opening, with a slide which is movable along a stationary slide guide and which is provided with a panel engagement element cooperating with a slide engagement element of the movable panel, wherein a movement of the slide is capable of generating a tilting and/or sliding movement of the panel.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

In accordance with an aspect of the present invention, panel engagement elements of the slide comprise two curves and slide engagement elements of the panel comprise two cams, each for cooperation with a respective one of the curves, such that, starting from the position in which the panel closes the roof opening, moving the slide in a first direction a cooperation between a first curve and corresponding first cam will lead to lowering a first transversal edge of the panel followed by translating the panel along with the slide, whereas, starting from said position in which the panel closes the roof opening, moving the slide in an opposite second direction a cooperation between the second curve and corresponding second cam will lead to lifting said first transversal edge of the panel.

In a first embodiment of the open roof construction, the first cam of the panel is positioned closer to said first transversal edge then the second cam, and correspondingly the first curve of the slide is positioned closer to said first transversal edge then the second curve.

Further it is possible that the panel is provided with a locking cam for cooperation with a stationary locking curve. For example, said locking curve may be provided with a vertical locking curve part in which the locking cam resides in the closed and lifted positions of the panel, and which merges into a horizontally extending locking curve part in which the locking cam resides in the lowered position of the panel.

If provided, said locking cam may be positioned at the side of the cams facing away from the first transversal edge, improving its effectivity.

In another embodiment of the open roof construction, the panel in the region of its opposite second transversal edge is provided with a slide shoe cooperating with a first horizontally extending guide channel, wherein the shape of the guide shoe allows a rotation thereof in the guide channel around an axis in parallel to a transversal edge of the panel. The guide shoe thus helps in defining the position of the panel while allowing a rotation thereof.

Further it is possible that the panel between the first cam and the first transversal edge is provided with a guide cam which during lowering said transversal edge enters a second horizontally extending guide channel and moves therein during the translational movement of the channel. This helps define the position of the panel in its lowered position.

Then, in a special embodiment, it is possible too that the first horizontally extending guide channel defines the second horizontally guide channel too.

According to yet another embodiment of the open roof construction, the first cam in the lowered position of the panel has entered a horizontally extending guide channel. In such a case a guide cam as mentioned above may be omitted.

It is an advantage then when the horizontally extending guide channel corresponds with the first or second horizontally extending guide channel as defined above.

The open roof construction offers a number of advantages, depending on its specific embodiment. It may reduce the dimensions (specifically, but not exclusively, the width and height) and cost (due to the use of less complicated and smaller parts) of such a construction. The available daylight opening provided may be increased while maintaining a similar tilting height compared to known open roof constructions. Further a smaller packaging of guide rails may be achieved, adding to a cost saving and an increase of the daylight opening in a transverse direction. The use of two curve and cam assemblies enables an increase of the support length of the panel and thus optimises the dynamic panel force behavior (especially in a vertical direction).

BRIEF DESCRIPTION OF THE DRAWINGS

Aspects of the invention will be elucidated while referring to the drawings, in which.

DETAILED DESCRIPTION OF THE ILLUSTRATIVE EMBODIMENTS

Figure 1:
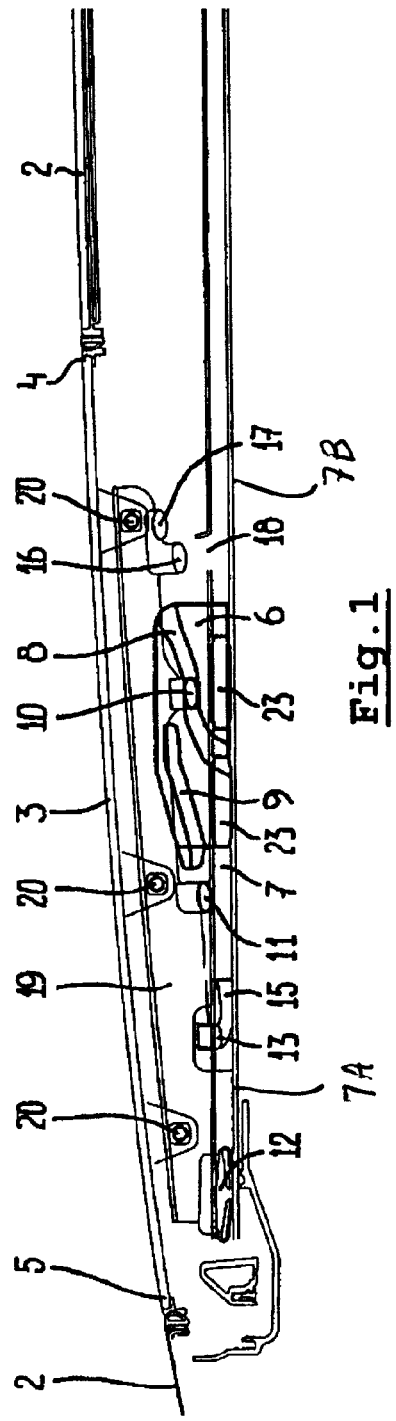
FIGS. 1-4 show, in respective schematical side elevational views, an embodiment of the open roof construction in four different positions, i.e. closed, dropped, slid open and tilted.

Before the present invention is discussed, the following is noted. The components of the open roof construction illustrated in the drawings and mentioned in the claims define mechanisms, of which more than one may be present in an open roof construction. Specifically, for example, two slides may be present at opposite longitudinal sides of a roof opening, cooperating with corresponding parts. The following discussion basically refers to components arranged at one longitudinal side of the roof opening; the components arranged at the opposite longitudinal side of the roof opening are similar, but most times constructed as a mirror image.

Figure 3:
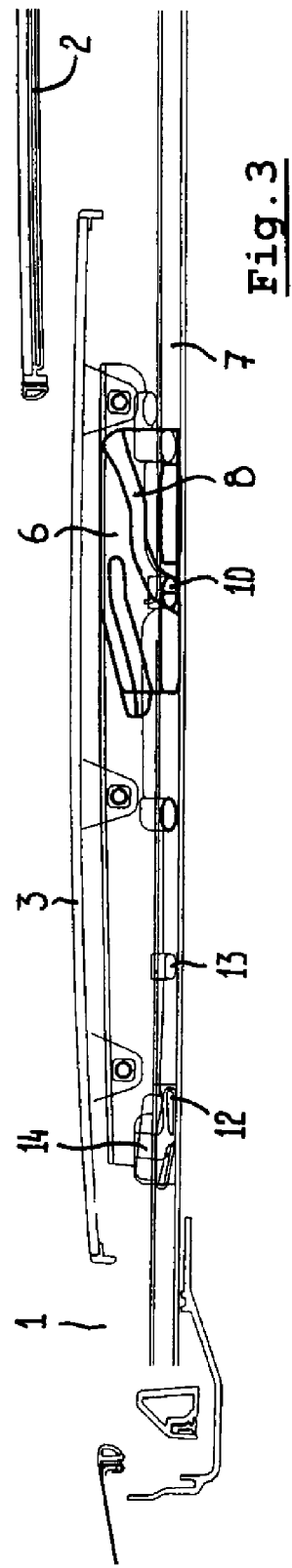

Firstly referring to FIG. 1, an open roof construction for a vehicle is shown schematically and in a side elevational view, in a first closed position. The open roof construction comprises a roof opening 1 (best illustrated in FIG. 3) defined in a stationary roof part 2. A roof assembly having a movable panel 3 is provided for opening and closing said roof opening 1. In the closed position of the panel 3 illustrated in FIG. 1, a first (rearward) transversal edge 4 and a second (forward) transversal edge 5 thereof engage corresponding parts of the stationary roof part 2 (for example by means of a seal known per se).

In the roof assembly below the panel 3 a slide 6 is provided which is movable along a stationary slide guide 7. The slide comprises a first curve 8 for cooperation with a first cam 10 of the panel 3 and a second curve 9 for cooperation with a second cam 11 of the panel.

In the region of its second transversal edge 5 the panel 3 is provided with a slide shoe 12 which, in the illustrated embodiment, is housed in an extending guide channel of a first slide guide 7A in such a manner, that it not only can slide therein but also may carry out a rotation therein around an axis (not illustrated) in parallel to a transversal edge of the panel 3. It is noted, that it is also possible that the slide shoe 12 is housed in a separate guide channel (i.e. first slide guide 7A forms a separate slide guide) which basically would extend in parallel to the slide guide 7. In the embodiment illustrated, portions 7A and 7B (discussed below) form a single guide structure 7, which will be referred to generally hereinafter, but should not be considered as the only possible, embodiment.

The panel 3 further is provided with a locking cam 13 for cooperation with a stationary locking curve. Such a locking curve comprises a vertical locking curve part 14 (best illustrated in FIG. 3) which merges into a horizontally extending locking curve part 15. In the illustrated embodiment the locking cam 13, in a longitudinal position, is positioned between the slide shoe 12 and second cam 11 of the panel 3.

Between the first cam 10 and the first transversal edge 4 the panel 3 is provided with a guide cam assembly comprising a guide cam 16 and an auxiliary guide cam 17, the function of which will become clear later.

When, starting from the position illustrated in FIG. 1 in which the panel 3 closes the roof opening 1, slide 6 is moved rearwardly (to the right in FIG. 1) by means of driving means not illustrated (for example a drive cable known per se) the cooperation between the first curve 8 and first cam 10 will lower the first rearward transversal edge 4 of the panel while the panel 3 rotates around its slide shoe 12. A translational movement of the panel 3 together with the slide 6 will be prevented initially, because the locking cam 13 of the panel 3 still is in the vertical locking curve part 14. The rotation of the panel 3 while lowering its transversal edge 4 will lead to a disengagement between the transversal edges 4, 5 and corresponding parts of the stationary roof part 2.

Figure 2:
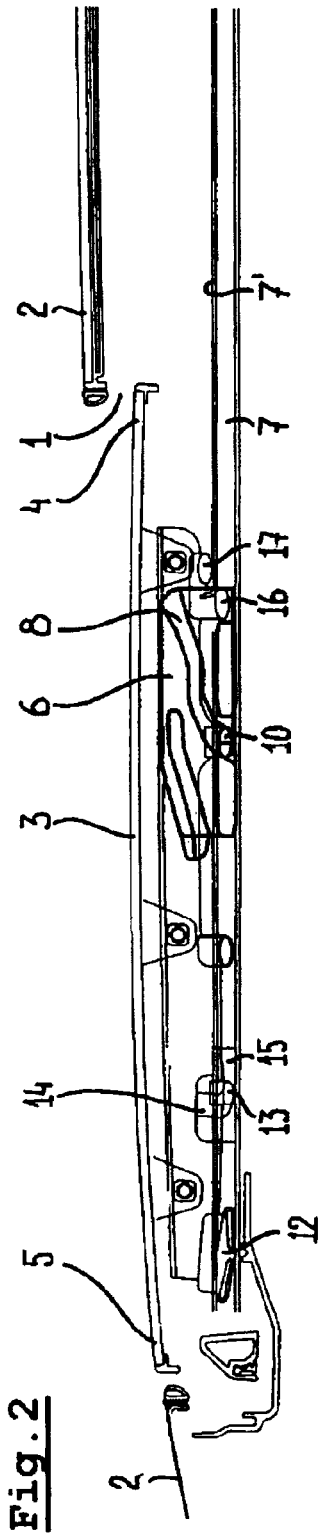

FIG. 2 shows the situation, in which the transversal edge 4 of the panel 3 is lowered that far, that the locking cam 13 has reached the horizontal locking curve part 15 (which in the present embodiment merges into the slide guide 7, but which in an alternative embodiment could merge into a separate guide channel).

The guide cam 16 has entered an extending guide channel of a second slide guide 7B through an opening 18 (FIG. 1) therein, and the auxiliary guide cam 17 now rests upon an upper part 7' of the slide guide 7. In this position of the panel 3 a further movement of the slide 6 will move the panel 3 along therewith in accordance with FIG. 3 (the sides of the curve 8 engaging the cam 10 and the slide shoe 12 moving along the slide guide 7). Such a movement of the slide 6 together with the panel 3 can be maintained until the panel 3 is positioned entirely below the corresponding stationary roof part 2, in which the roof opening 1 is completely opened.

Starting from such a completely opened position of the panel 3, moving the slide forward again (to the left in the figures) will lead to a corresponding movement of the panel, until the locking cam 13 has reached the vertical locking curve part 14, after which the longitudinal movement of the panel 3 is stopped and the slide 6 moves forward relative the panel 3, thus again lifting the transversal edge 4 through the cooperation between the first cam 10 of the panel and the first curve 8 of the slide 6.

Starting from the position illustrated in FIG. 1 it is also possible to move the slide forwardly (to the left in the figures) while the panel does not move in the longitudinal direction (prevented by the locking cam 13 in vertical locking curve part 14). As a result, first cam 10 will leave the first curve 8 and second cam 11 will enter the second curve 9. The cooperation between the second cam 11 of the panel and second curve 9 of the slide then will cause a rotation of the panel 3 around its slide shoe 12, as a result of which the transversal edge 4 is lifted (towards a so-called tilted position of the panel 3). This situation has been illustrated in FIG. 4.

Starting from the position illustrated in FIG. 4, again moving the slide 6 in a rearward direction will cause the transversal edge 4 of the panel 3 to drop again to the closed position illustrated in FIG. 1.

Figure 4:
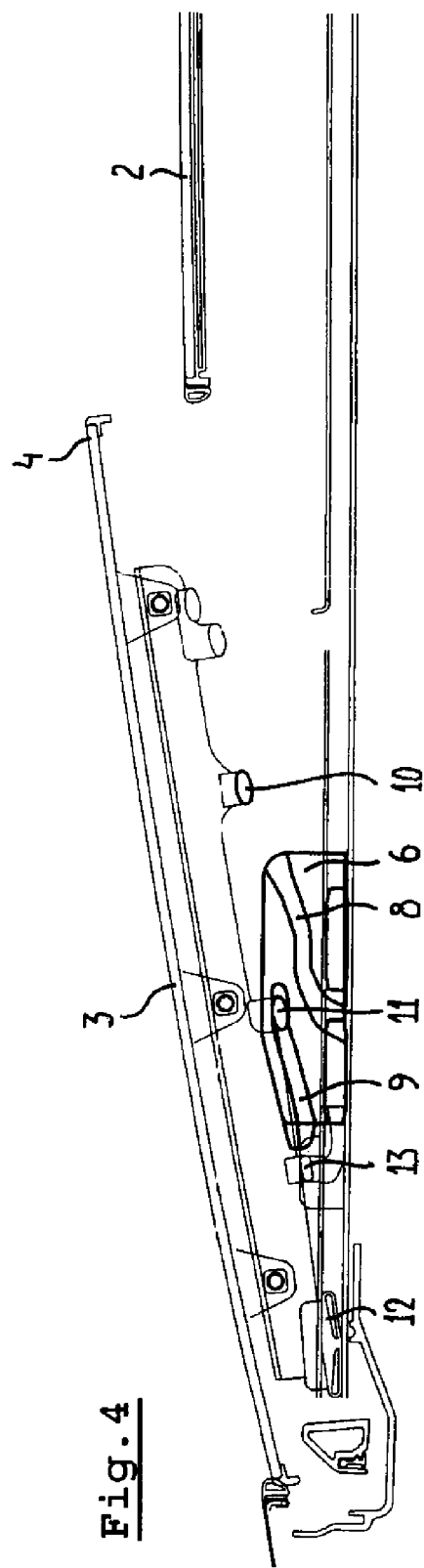

Generally, somewhere between the positions illustrated in FIG. 1 and FIG. 4 there will be a situation, in which both the first cam 10 and second cam 11 cooperate with the respective first curve 8 and second curve 9. As a result, the position of the panel 3 always is defined in an effective manner.

It is not strictly necessary to provide a guide cam 16 in combination with an auxiliary guide cam 17. However, such a combination offers the best results for eliminating any play.

Figure 5:
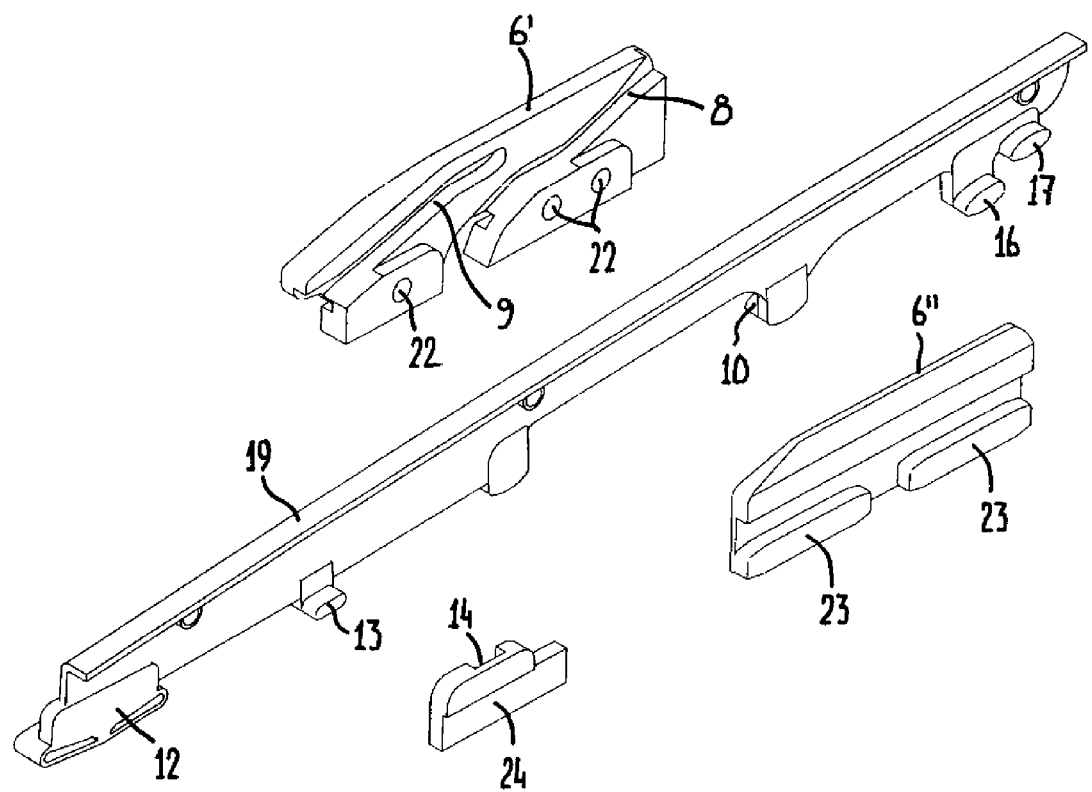
FIGS. 5 and 6 show perspective explosive views from different directions of parts of the open roof construction.
Figure 6:
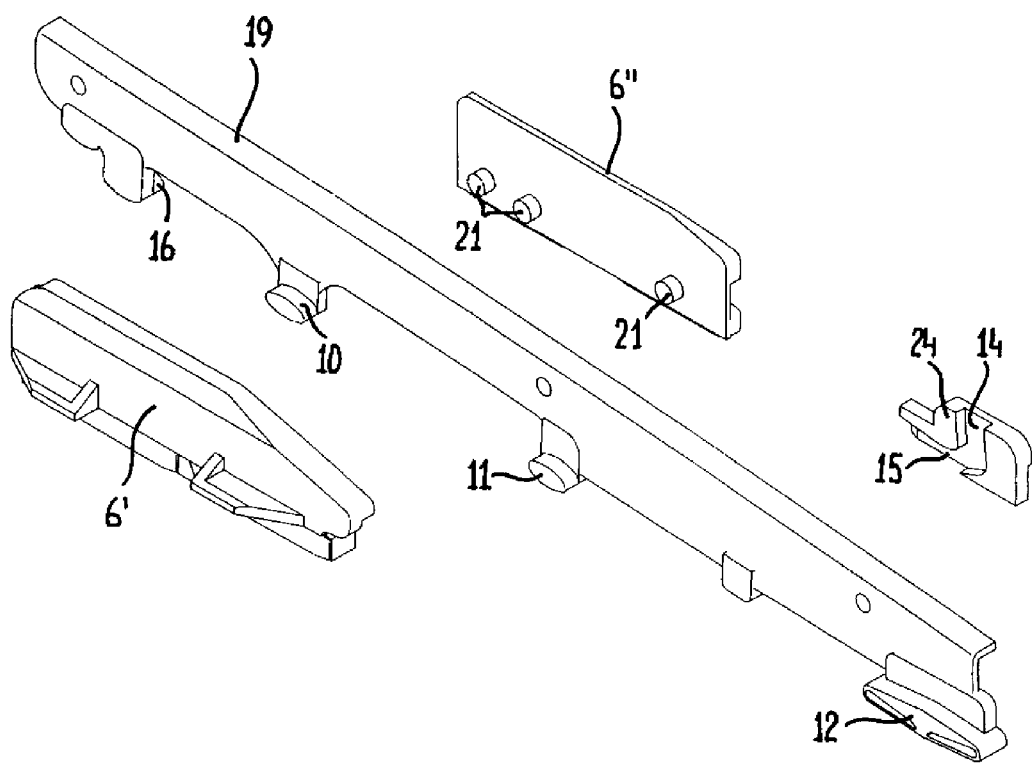

Next, reference is made to FIGS. 5 and 6 showing parts of the open roof construction in a disassembled state and from different sides. These figures show a brace 19 carrying the first and second cams 10, 11, slide shoe 12, locking cam 13, guide cam 16 and auxiliary guide cam 17. This brace 19 is attached to the panel 3, for example by means of bolts or rivets 20.

Further, FIGS. 5 and 6 show a first slide part 6' and a second slide part 6" which together define slide 6. For assembling the slide parts 6' and 6" projections 21 on part 6' will enter holes 22 on part 6". The first curve 8 and second curve 9 are provided in the first slide part 6'. The second part 6" is provided with slide shoes 23 for cooperation with the slide guide 7. Corresponding slide shoes are provided on part 6', but are not visible here.

Finally, FIGS. 5 and 6 show a locking part 24 defining the vertical locking curve part 14 and horizontal locking curve part 15.

The invention is not limited to the embodiment described before, which may be varied widely within the scope of the invention as defined by the appending claims.

The invention claimed is:

1. An open roof construction for a vehicle, comprising a roof opening defined in a stationary roof part, a movable panel for opening and closing said roof opening, a slide which is movable along a stationary slide guide and which is provided with a guide mechanism having panel engagement elements cooperating with slide engagement elements of the movable panel, wherein a movement of the slide is capable of generating a tilting and/or sliding movement of the panel, wherein the panel engagement elements of the slide comprise first and second curves and that the slide engagement elements of the panel comprise first and second cams, each for cooperation with a respective one of the first and second curves, such that, starting from the position in which the panel closes the roof opening, moving the slide in a first direction a cooperation between the first curve and corresponding first cam will lead to lowering a first transversal edge of the panel followed by translating the panel along with the slide, whereas, starting from said position in which the panel closes the roof opening, moving the slide in a second direction opposite the first direction a cooperation between the second curve and corresponding second cam will lead to lifting said first transversal edge of the panel, wherein relative positions between the first curve and the first cam and between the second curve and the second cam are such that during the movement of the panel in said first direction starting from the position in which the panel closes the roof opening the second curve and the second cam are not in engagement with each other, and such that during the movement of the panel in said second direction starting from the position in which the panel closes the roof opening the second curve and the second cam will come in engagement with each other while the first curve and first cam will disengage each other.

2. The open roof construction according to claim 1, wherein the first cam of the panel is positioned closer to said first transversal edge then the second cam, and wherein correspondingly the first curve of the slide is positioned closer to said first transversal edge then the second curve.

3. The open roof construction according to claim 1, wherein the panel is provided with a locking cam for cooperation with a stationary locking curve.

4. The open roof construction according to claim 3, wherein the locking curve is provided with a vertical locking curve part in which the locking cam resides in the closed and lifted positions of the panel, and which merges into a horizontally extending locking curve part in which the locking cam resides in the lowered position of the panel.

5. The open roof construction according to claim 3, wherein the panel includes a second transversal edge opposite the first transversal edge and the locking cam is positioned between the second transversal edge and the closer of the first and second cams.

6. The open roof construction according to claim 1, wherein a second transversal edge of the panel, the second transversal edge being opposite the first transversal edge, is provided with a slide shoe cooperating with a first horizontally extending guide channel, wherein the shape of the guide shoe allows a rotation thereof in the guide channel around an axis in parallel to a transversal edge of the panel.

7. The open roof construction according to claim 1, wherein the panel between the first cam and the first transversal edge is provided with a guide cam which during lowering said transversal edge enters a second horizontally extending guide channel and moves therein during the translational movement of the channel.

8. The open roof construction according to claim 7, wherein the first horizontally extending guide channel and the second horizontally guide channel together comprise a combined guide channel.

9. The open roof construction according to claim 1, wherein in the lowered position of the panel the first cam has entered a horizontally extending guide channel.

10. The open roof construction according to claim 9, wherein a second transversal edge of the panel is opposite the first transversal edge, wherein the panel in the region of the second transversal edge is provided with a slide shoe cooperating with a first horizontally extending guide channel formed in the stationary guide, wherein the shape of the guide shoe allows a rotation thereof in the guide channel around an axis in parallel to a transversal edge of the panel.

11. A roof assembly comprising:
a movable panel having on opposite sides of the panel each first and second cams;
two stationary slide guides, wherein a slide guide is disposed on each of said opposite sides of the panel;
two slides, wherein each slide is movable along one of the stationary slide guides to generate a tilting and/or sliding movement of the panel, each slide having a guide mechanism with first and second curves configured to cooperate with the first and second cams, respectively on one of the opposite sides of the panel, such that, starting from a first position, moving the slides in a first direction a cooperation between the first curves and corresponding first cams on each of the opposite sides of the panel will lead to lowering a first transversal edge of the panel followed by translating the panel along with the slides on the slide guides, whereas, starting from said first position and moving the slides in a second direction opposite the first direction a cooperation between the second curves and corresponding second cams on each of the opposite sides of the panel will lead to lifting said first transversal edge of the panel, wherein in at least one position of the panel, each of the first cams are in engagement with the corresponding first guide curves and each of the second cams are in engagement with the corresponding second guide curves, and wherein in a second position obtained by movement of the panel in said first direction starting from said first position only the first cams and corresponding first curves are in engagement while the second cams and second curves are not engaged, and wherein in a third position obtained by movement of the panel starting from said first position in a second direction opposite the first direction only the second cams and corresponding second curves are in engagement while the first cams and first curves are not engaged.

12. The roof assembly according to claim 11, wherein the first cams of the panel are positioned closer to said first transversal edge than the second cams, and wherein correspondingly the first curve of each slide is positioned closer to said first transversal edge then the corresponding second curve of each slide.

13. The roof assembly according to claim 11 and further comprising a stationary locking curve, and wherein the panel is provided with a locking cam for cooperation with the stationary locking curve.

14. The roof assembly according to claim 13, wherein the locking curve is provided with a vertical locking curve part in which the locking cam resides in the closed and lifted positions of the panel, and which merges into a horizontally extending locking curve part in which the locking cam resides in the lowered position of the panel.

15. The roof assembly according to claim 14, wherein the panel includes a second transversal edge opposite the first transversal edge and wherein the locking cam is positioned on a side of the panel between the second transversal edge and the closer of the first and second cams on that side of the panel.

16. The roof assembly according to claim 11, wherein a second transversal edge of the panel, the second transversal edge being opposite the first transversal edge, is provided with two slide shoes wherein a shoe cooperates with a first horizontally extending guide channel of the stationary guides on each side of the panel, and wherein the shape of the guide shoes allow a rotation thereof in the respective guide channel around an axis in parallel to a transversal edge of the panel.

17. The roof assembly according to claim 11, wherein the panel between the first cam and the first transversal edge on each of the opposite sides of the panel is provided with a guide cam which during lowering said transversal edge enters a second horizontally extending guide channel in each of the stationary guides and moves therein during the translational movement of the channel.

18. The roof assembly according to claim 17, wherein each of the first horizontally extending guide channels and the respective second horizontally guide channel together comprise a combined guide channel on each of the opposite sides of the panel.

19. The roof assembly according to claim 11, wherein in the lowered position of the panel the first cam on each of the opposite sides of the panel has entered a corresponding horizontally extending guide channel in each stationary slide guide.

20. The roof assembly according to claim 19, wherein the panel between the first cam and the first transversal edge on each of the opposite sides of the panel is provided with a guide cam which during lowering of said first transversal edge enters a corresponding second horizontally extending guide channel and moves therein during the translational movement of the panel.

21. A roof assembly comprising:
a movable panel;
a stationary slide guide;
a slide which is movable along the stationary slide guide to generate a tilting and/or sliding movement of the panel, the slide and panel being configured with a guide mechanism having first and second cams and first and second curves configured to cooperate with the first and second cams, respectively, such that, in a first position of the panel relative to the stationary slide guide obtained by moving the slide in a first direction on the stationary slide guide only the first cam engages the first curve while the second cam and the second curve are free from engagement, and in a second position of the panel relative to the stationary guide slide where the panel is inclined relative to the stationary guide slide more than in the first position and obtained by moving the slide in a second direction on the stationary slide guide opposite the first direction only the second cam engages the second curve while the first cam and the first curve are free from engagement.

* * * * *